United States Patent
Lee et al.

(10) Patent No.: US 8,963,807 B1
(45) Date of Patent: Feb. 24, 2015

(54) HEAD MOUNTED DISPLAY AND METHOD FOR CONTROLLING THE SAME

(71) Applicant: LG Electronics Inc., Seoul (KR)

(72) Inventors: Doyoung Lee, Seoul (KR); Jihwan Kim, Seoul (KR); Jongho Kim, Seoul (KR); Eunhyung Cho, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/190,746

(22) Filed: Feb. 26, 2014

(30) Foreign Application Priority Data

Jan. 8, 2014 (KR) .......................... 10-2014-0002293

(51) Int. Cl.
 *G02B 27/01* (2006.01)
(52) U.S. Cl.
 CPC .................................... *G02B 27/017* (2013.01)
 USPC ............................................................. 345/8
(58) Field of Classification Search
 CPC .............. G06F 3/011–3/013; G02B 27/0179; G02B 2027/0178–2027/0179; G02B 27/017
 USPC ................... 345/7, 8, 633; 382/118
 See application file for complete search history.

(56) References Cited

U.S. PATENT DOCUMENTS

| | | | |
|---|---|---|---|
| 2009/0003662 | A1 | 1/2009 | Joseph et al. |
| 2010/0007601 | A1 | 1/2010 | Lashina et al. |
| 2011/0153341 | A1 | 6/2011 | Diaz-Cortes |
| 2011/0169932 | A1 | 7/2011 | Mula et al. |
| 2012/0026191 | A1 | 2/2012 | Aronsson et al. |
| 2013/0021502 | A1* | 1/2013 | Oku et al. ............... 348/240.99 |
| 2013/0169682 | A1* | 7/2013 | Novak et al. ................. 345/633 |
| 2014/0078175 | A1* | 3/2014 | Forutanpour et al. ......... 345/633 |

FOREIGN PATENT DOCUMENTS

| | | | |
|---|---|---|---|
| JP | 2011-67277 A | 4/2011 | |
| JP | 2011-242591 A | 12/2011 | |

* cited by examiner

*Primary Examiner* — Allison Johnson
(74) *Attorney, Agent, or Firm* — Birch, Stewart, Kolasch & Birch, LLP (57) ABSTRACT

A head mounted display (HMD) is disclosed. The HMD includes a camera unit configured to capture an image; a display unit configured to display an information image; and a processor configured to control the camera unit and the display unit, wherein the processor is further configured to: detect an object using the camera unit, wherein the object has a staring state in which the object substantially stares at a wearer wearing the HMD and an unstaring state in which the object does not substantially stares at the wearer, display a first information image when the object in the staring state is detected, display a second information image when the object in the unstaring state is detected, and wherein the first information image includes at least one of a different amount of displayed information from the second information image and a different displaying location from the second information image.

17 Claims, 9 Drawing Sheets

$\theta 1 > \theta 2$

HEAD MOUNTED DISPLAY AND METHOD FOR CONTROLLING THE SAME

Pursuant to 35 U.S.C. §119(a), this application claims the benefit of Korean Patent Application No. 10-2014-0002293 filed on Jan. 8, 2014, which is hereby incorporated by reference as if fully set forth herein.

BACKGROUND OF THE DISCLOSURE

1. Field of the Disclosure

The disclosure relates to a head mounted display (HMD), and more particularly, to an HMD for controlling display of an information image according to a state of an object, and a method for controlling the same.

2. Discussion of the Related Art

A head mounted display (HMD) is wearable by a user like glasses. An HMD wearer may receive various information from the HMD. In particular, the HMD may provide selected information according to eyes of the HMD wearer or appropriately arrange various information.

However, a conventional HMD has a limitation in providing information based on only eyes of an HMD wearer. Accordingly, when the HMD wearer communicates with another person like a conversation, the HMD also provides information based on only eyes of the HMD wearer on the basis of the HMD wearer. In this case, when the HMD wearer provides information based on only eyes of the HMD wearer, which is not appropriate for a situation of communication with another person, problems arise in that various information cannot be effectively provide to the HMD wearer. In addition, problems arise in that the HMD provides information that is not desired by the HMD wearer in an inappropriate situation.

Accordingly, the HMD needs to detect a staring state of another person with respect to the HMD wearer and to provide appropriate information according to a current situation.

SUMMARY OF THE DISCLOSURE

Accordingly, the disclosure is directed to a [title] that substantially obviates one or more problems due to limitations and disadvantages of the related art.

An object of the disclosure is to provide a head mounted display (HMD) for controlling display of an information image according to a state of an object, and a method for controlling the HMD.

Another object of the disclosure is to provide an HMD for displaying information images displayed at different locations and having different amounts of information according to a state of an object, and a method for controlling the HMD.

Another object of the disclosure is to provide an HMD for detecting a direction of a face and/or eyes contained in an object to detect a state of the object, and a method for controlling the HMD.

Another object of the disclosure is to provide an HMD for detecting a horizontal rotation degree of an object to detect a state of the object, and a method for controlling the HMD.

A further object of the disclosure is to provide an HMD for maintaining display of an information image for a predetermined period of time even if a state of an object is converted, and a method for controlling the HMD.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a head mounted display (HMD) includes a camera unit configured to capture an image; a display unit configured to display an information image; and a processor configured to control the camera unit and the display unit, wherein the processor is further configured to: detect an object using the camera unit, wherein the object has a staring state in which the object substantially stares at a wearer wearing the HMD and an unstaring state in which the object does not substantially stares at the wearer, display a first information image when the object in the staring state is detected, display a second information image when the object in the unstaring state is detected, and wherein the first information image includes at least one of a different amount of displayed information from the second information image and a different displaying location from the second information image.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

The terms used in the disclosure are defined in consideration of functions used in the disclosure, and can be changed according to the intent, conventionally used methods of operators, or advent of new technologies. In specific cases, the terms can be selected by an application. In this case, the meaning of the terms will be described in a corresponding embodiment. Accordingly, definitions of the terms should be understood on the basis of the substantial meaning and the entire description of the present disclosure instead of simple names of the terms.

Reference will now be made in detail to the embodiments, examples of which are illustrated in the accompanying drawings. However, the embodiments should not be construed as limited to the exemplary embodiments set forth herein.

Figure 1:
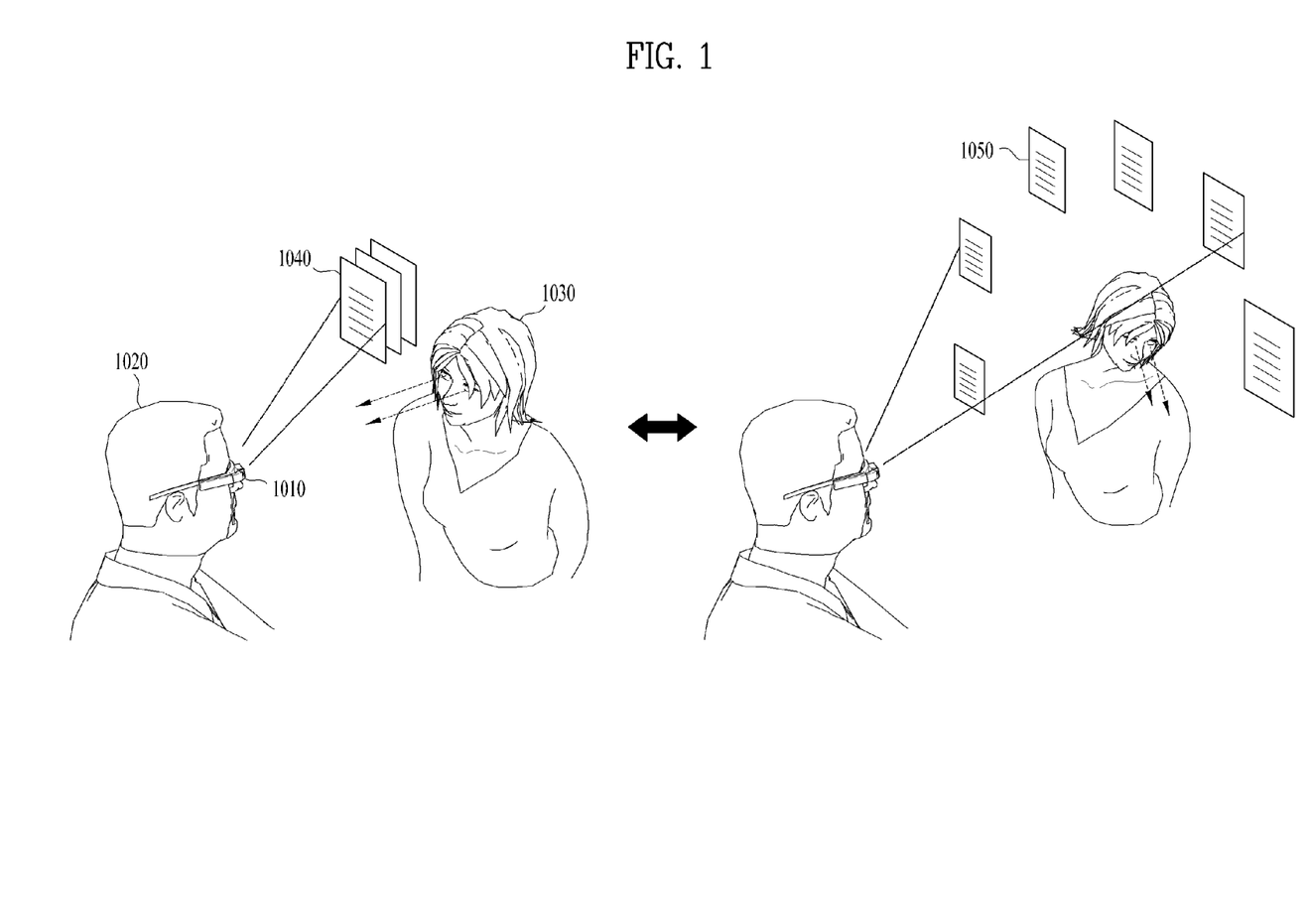
FIG. 1 is a diagram illustrating a head mounted display (HMD) for controlling display of an information image according to a state of an object according to an embodiment of the disclosure.

FIG. 1 is a diagram illustrating a head mounted display (HMD) 1010 for controlling display of an information image according to a state of an object 1030 according to an embodiment of the disclosure.

In the disclosure, the HMD 1010 may control display of an information image according to the state of the object 1030 detected by the HMD 1010. In more detail, HMD 1010 may detect the state of the object 1030 and control display of the information image according to the state of the detected object 1030. Here, the object 1030 is a persona positioned in front of the HMD 1010, and in more detail, a person that is positioned within a viewing angle of a camera unit included in the HMD 1010 and can be detected by the camera unit. The object 1030 may have a staring state in which the object 1030 stares at an HMD wearer 1020 and an unstaring state in which the object 1030 does not stare at the HMD wearer 1020, which will be described in more detail with reference to FIG. 3.

The HMD 1010 may detect the staring state and/or the unstaring state of the object 1030 and display an information image corresponding to each state. For example, upon detecting the staring state of the object 1030, the HMD 1010 may display a first information image 1040 corresponding to the staring state. On the other hand, upon detecting the unstaring state of the object 1030, the HMD 1010 may display a second information image 1050 corresponding to the unstaring state. Here, the first information image 1040 may refer to an image with a different information amount or different displaying location from the second information image 1050. Various embodiments of an information image will be described in detail with reference to FIGS. 4A to 4C.

Figure 2:
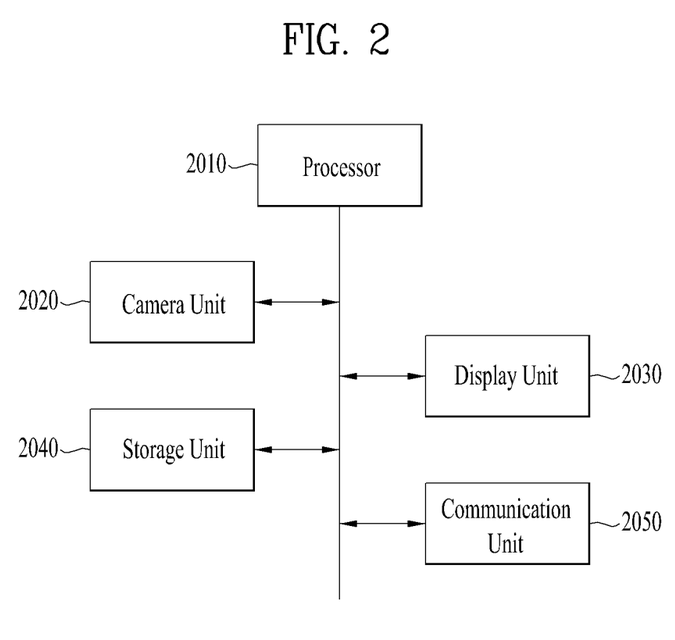
FIG. 2 is a block diagram of an HMD according to an embodiment of the disclosure.

FIG. 2 is a block diagram of an HMD according to an embodiment of the disclosure. Referring to FIG. 2, the HMD may include a processor 2010, a camera unit 2020, a display unit 2030, a storage unit 2040, and a communication unit 2050.

The camera unit 2020 may capture an image. In more detail, the camera unit 2020 may capture an image using at least one camera sensor mounted on the HMD. Furthermore, the camera unit 2020 may transmit a capture result to the processor 2010. The processor 2010 may detect the presence and state of an object using the capture result received from the camera unit 2020, which will be described below in detail.

The display unit 2030 may display an information image. Here, the information image may indicate various visually-recognizable information such as an execution image of an application, a text, a moving picture, a still image, a picture, etc. In some embodiments, the display unit 2030 may display the information image as a virtual image or an augmented reality image. In particular, in the disclosure, the display unit 2030 may display a first information image and/or a second information image according to a state of an object, which will be described below with reference to FIGS. 4A to 4C.

The storage unit 2040 may temporarily or continuously store various types of information. In particular, in the disclosure, the storage unit 2040 may store personal information corresponding to an object. The storage unit 2040 may refer to various digital data storage spaces such as a flash memory, a random access memory (RAM), a solid state drive (SSD), etc.

The communication unit 2050 may communicate with an external device and/or a web server using various protocols to transmit and/or receive various information. In detail, the communication unit 2050 may access a network by wire and/or wirelessly to transmit and/or receive various information. In particular, in the disclosure, the communication unit 2050 may perform communication to transmit and/or receive various information images.

In some embodiments, the storage unit 2040 and the communication unit 2050 may be selectively included in the HMD.

The processor 2010 may process data in the HMD to execute various applications. In addition, the processor 2010 may control the aforementioned units to control data transmission and/or reception between the units.

In particular, in the disclosure, the processor 2010 may detect an object using the camera unit 2020. In more detail, the processor 2010 may acquire an image of a front portion of the HMD using the camera unit 2020, process the acquired image, and detect an object positioned in front of the HMD. Furthermore, the processor 2010 may process the acquired image of the object and detect a state of the object. Here, the state of the object may include a staring state in which the object stares at an HMD wearer and an unstaring state in which the object does not stare at the HMD wearer.

According to an embodiment of the disclosure, the processor 2010 may detect whether a face contained in the object is directed to a region within a predetermined diameter from the HMD to detect the state of the object. According to another embodiment of the disclosure, the processor 2010 may detect whether eyes contained in the object stare at a region within a predetermined diameter from the HMD to detect the state of the object. Alternatively, the processor 2010 may detect the state of the object according to a rotation degree of a face and/or eyes of the object. In addition, the processor 2010 may detect the state of the object according to a state maintenance time of the object. This will be described below with reference to FIGS. 3, 5A, and 5B.

When the processor 2010 detects the state of the object, the display unit 2030 may display an information image corresponding to each state. In more detail, upon detecting the staring state of the object, the processor 2010 may control the display unit 2030 to display a first information image. In addition, upon detecting the unstaring state of the object, the processor 2010 may control the display unit 2030 to display a second information image. Here, the first information image may refer to an image with a different information amount or different displaying location from the second information image. The first information image and the second information image will be described below in detail with reference to FIGS. 4A to 4C.

Hereinafter, when steps or operations performed by the HMD are begun or performed by sensing a user input, although a process of generating and receiving a signal according to the sensed user input is not repeatedly described, the process includes the aforementioned process. In addition, it may be expressed that the processor 2010 controls the HMD or at least one unit included in the HMD according to the user input and a description may be given on the assumption that the processor 2010 is regarded as the HMD itself.

FIG. 2 is a block diagram of the HMD according to an embodiment of the disclosure. The separately indicated blocks are formed by logically elements of the HMD. Accordingly, the aforementioned elements of the HMD may be mounted as a single chip or a plurality of chips according to a design of the HMD.

Figure 3:
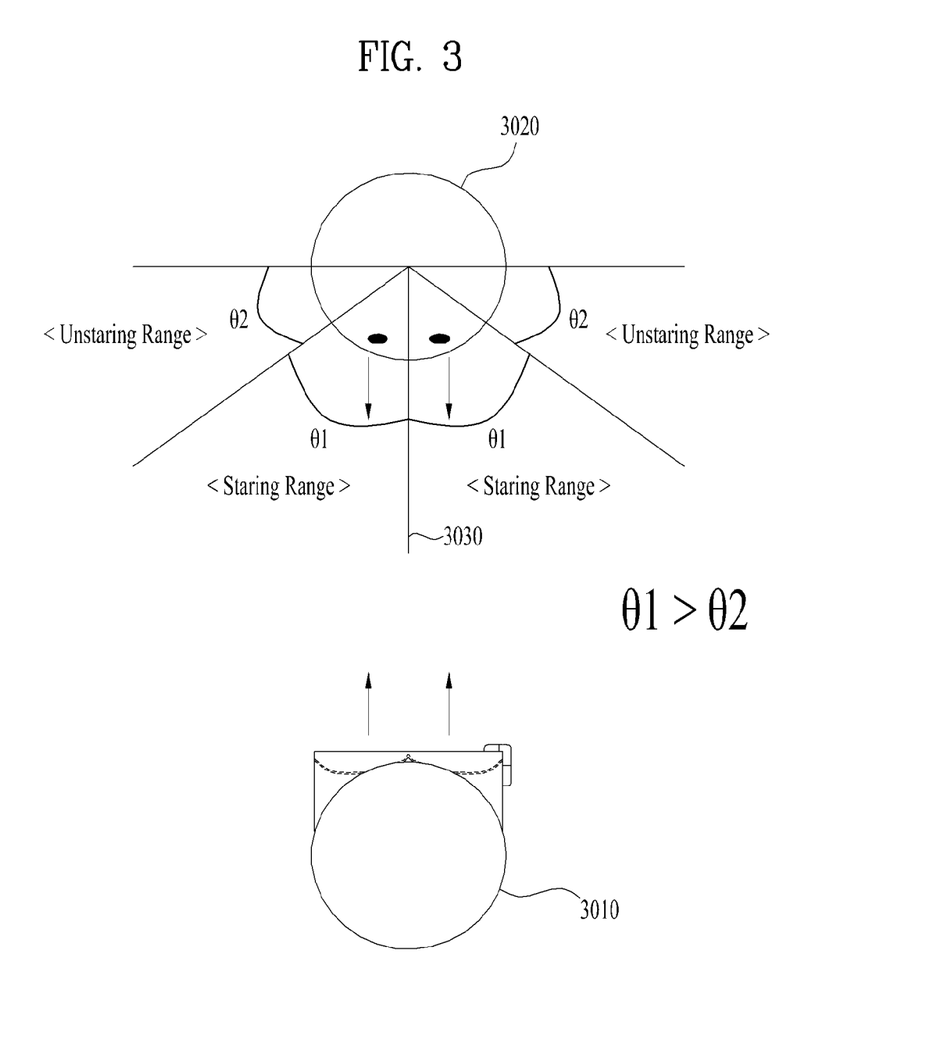
FIG. 3 is diagram illustrating an HMD that detects a state of an object according to an embodiment of the disclosure.

FIG. 3 is diagram illustrating an HMD that detects a state of an object according to an embodiment of the disclosure.

According to the disclosure, the HMD may detect a state of an object 3020 according whether the object 3020 stares at an HMD wearer 3010. In more detail, when the object 3020 stares at the HMD wearer 3010, the HMD may detect a staring state of the object 3020. On the other hand, when the object 3020 does not stare at the HMD wearer 3010, the HMD may detect an unstaring state of the object 3020. In this case, the HMD may use a camera unit included in the HMD as described with reference to FIG. 2.

In the disclosure, the expression in that the object 3020 stares at the HMD wearer 3010 may refers to a case in which the object 3020 "substantially" stares at the HMD wearer 3010. Thus, in this disclosure, the expression in which the object 3020 stares at the HMD wearer 3010 may include a case in which a face and/or eyes of the object 3020 are directed to the HMD wearer 3010 as well as a case in which the object 3020 directly stares at the HMD wearer 3010.

Based on the aforementioned features, according to various embodiments of the disclosure, the HMD according to the disclosure may detect the staring state or the unstaring state.

According to an embodiment of the disclosure, the HMD may detect a direction of a face contained in the object 3020 to detect a state of the object 3020. In more detail, when the face contained in the object 3020 is directed to the HMD wearer 3010, the HMD may determine that the object 3020 stares at the HMD wearer 3010 to detect the staring state of the object 3020. In addition, when the face of the object 3020 is directed to a region within a predetermined diameter from the HMD, the HMD may detect the staring state of the object 3020. On the other hand, when the face of the object 3020 is not directed to the HMD wearer 3010, the HMD may determine that the object 3020 does not stare at the HMD wearer 3010 to detect the unstaring state of the object 3020. In addition, when the face of the object 3020 is not directed to a region within a predetermined diameter from the HMD, the HMD may detect the unstaring state of the object 3020.

According to another embodiment of the disclosure, the HMD may detect a direction of eyes contained in the object 3020 to detect a state of the object 3020. In more detail, when eyes contained in the object 3020 are directed to the HMD wearer 3010, the HMD may detect the staring state of the object 3020. In addition, when eyes of the object 3020 are directed to a region within a predetermined diameter from the HMD, the HMD may detect the staring state of the object 3020. On the other hand, when the eyes contained in the object 3020 are not directed to the HMD wearer 3010, the HMD may detect the unstaring state of the object 3020. In addition, when the eyes of the object 3020 are not directed to the region within the predetermined diameter from the HMD, the HMD may detect the unstaring state of the object 3020.

In relation to the aforementioned embodiments, the predetermined region for detecting the staring state of the object 3020 may be set by a manufacturer during a manufacturing process of the HMD or may be set in various types according to a type of an executed application, a design objective of the HMD, a design of the HMD, the HMD wearer 3010, etc.

Furthermore, the HMD may combine the aforementioned embodiments to detect the staring state or the unstaring state. For example, when the face and eyes contained in the object 3020 are directed to the HMD wearer 3010, the HMD may detect the staring state of the object 3020. On the other hand, when the face and eyes contained in the object 3020 are not directed to the HMD wearer 3010, the HMD may detect the unstaring state of the object 3020.

The HMD may detect state conversion of the object 3020 according to a horizontal rotation degree of the object 3020. In more detail, as illustrated in FIG. 3, the HMD may set a staring range $\theta 1$ and an unstaring range $\theta 2$ based on a direction 3030 in which the object 3020 stares at the HMD wearer 3010 to detect state conversion according to the horizontal rotation degree of the object 3020. Here, the staring range $\theta 1$ may refer to a horizontal rotation angle range for detecting the object 3020 in the staring state. In addition, the unstaring range $\theta 2$ may refer to a horizontal rotation angle range for detecting the object 3020 in the unstaring state.

When a horizontal rotation angle of the face and/or eyes of the object 3020 is within the staring range $\theta 1$, the HMD may detect the staring state. In addition, the horizontal rotation angle of the face and/or eyes of the object 3020 is within the unstaring range $\theta 2$, the HMD may detect the unstaring state. Furthermore, when the face and/or eyes of the object 3020 in the staring state horizontally rotate to deviate from the staring range $\theta 1$, the HMD may detect conversion into the unstaring state of the object 3020. In addition, when the face and/or eyes of the object 3020 in the unstaring state horizontally rotate to enter the staring range $\theta 1$, the HMD may detect conversion into the staring state of the object 3020. Here, the staring range $\theta 1$ may refer to a horizontal rotation angle range which is set based on the direction 3030 at which the object 3020 stares at the HMD wearer 3010.

In this case, the HMD may set the staring range $\theta 1$ greater than the unstaring range $\theta 2$. In more detail, as illustrated in FIG. 3, when an angle range of 90 degrees based on the direction 3030 in which the object 3020 stares at the HMD wearer 3010 is a maximum angle degree for detecting the state of the object 3020, the staring range $\theta 1$ may be set greater than the unstaring range $\theta 2$. The staring range $\theta 1$ is set wide in order to prevent an information image from being frequently converted according to rotation of the object 3020. When the staring range $\theta 1$ is set narrow, even if the face or eyes of the object 3020 are slightly turned, an information image may be converted. In this case, the HMD wearer 3010 cannot be guaranteed by continuity of providing information due to continuous information image conversion and also cannot concentrate on a conversation during the conversation with another person.

Thus, as illustrated in FIG. 3, the HMD may overcome the aforementioned problems by setting the staring range $\theta 1$ greater than the unstaring range $\theta 2$.

Although the aforementioned embodiment has been described in terms of a case in which an object rotates in a horizontal direction, the embodiment may also be applied to a case in which the object rotates in a vertical direction. Accordingly, a staring range and unstaring range of a vertical rotation direction may be set based on a direction in which an object stares at an HMD wearer. In this case, the staring range may also be set greater than the unstaring range.

In addition, although not illustrated in FIG. 3, the HMD may also detect a state in which the HMD wearer 3010 as well as the object 3020 stares at the object 3020 as a staring state. In addition, in the disclosure, the HMD may also detect a state in which the HMD wearer 3010 as well as the object 3020 does not stare at the object 3020 as an unstaring state. For example, the HMD may detect a state in which the object 3020 stares at the HMD wearer 3010 and the HMD wearer 3010 stares at the object 3020 as a staring state. In addition, the HMD may detect a state in which the object 3020 does not stare at the HMD wearer 3010 or the HMD wearer 3010 does not stare at the object 3020 as an unstaring state. This may be applied to an embodiment in which a state of a conversation between two people needs to be detected, like in a case in which a first information image displayed in the staring state is an information image associated with a conversation between the HMD wearer 3010 and another person.

Figure 4A:
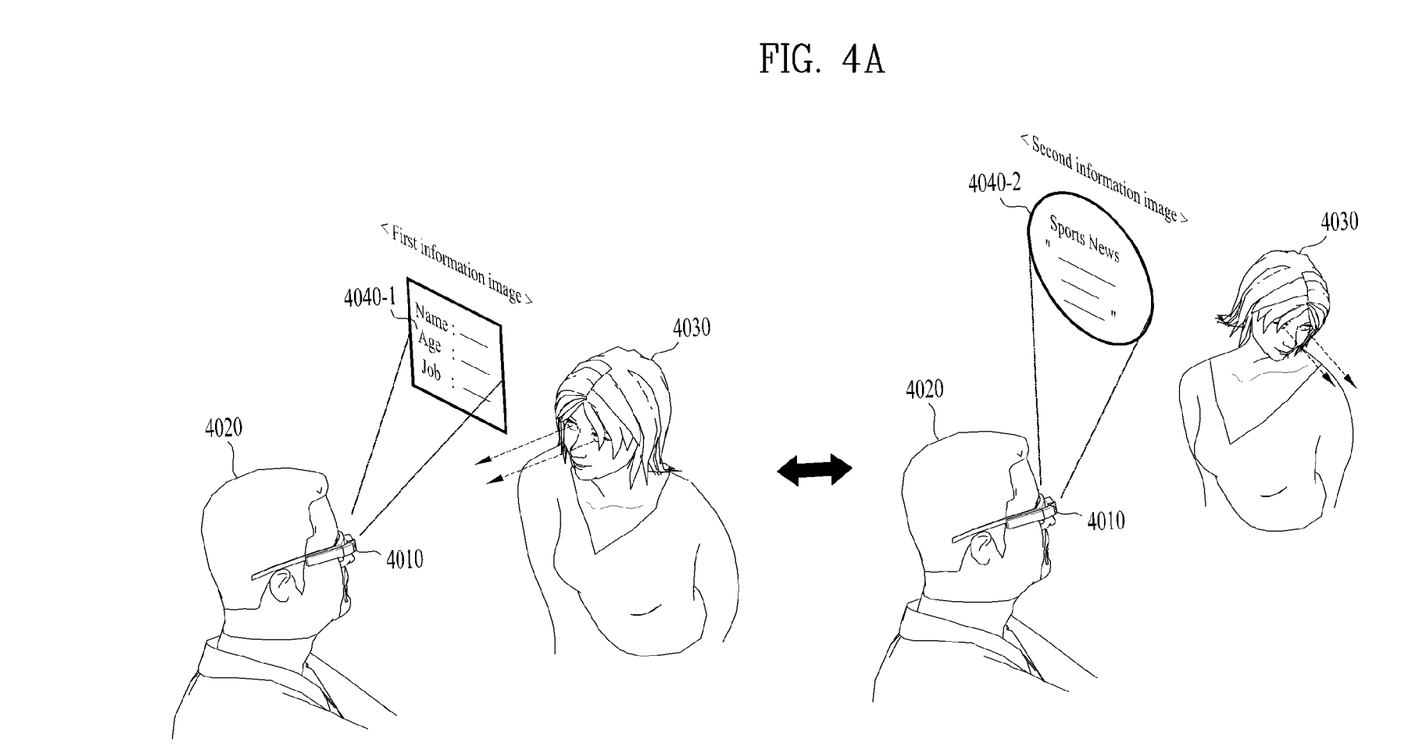
FIGS. 4A to 4C are diagrams illustrating an HMD for displaying a first information image or a second information image based on a state of an object, according to embodiments of the disclosure.
Figure 4B:
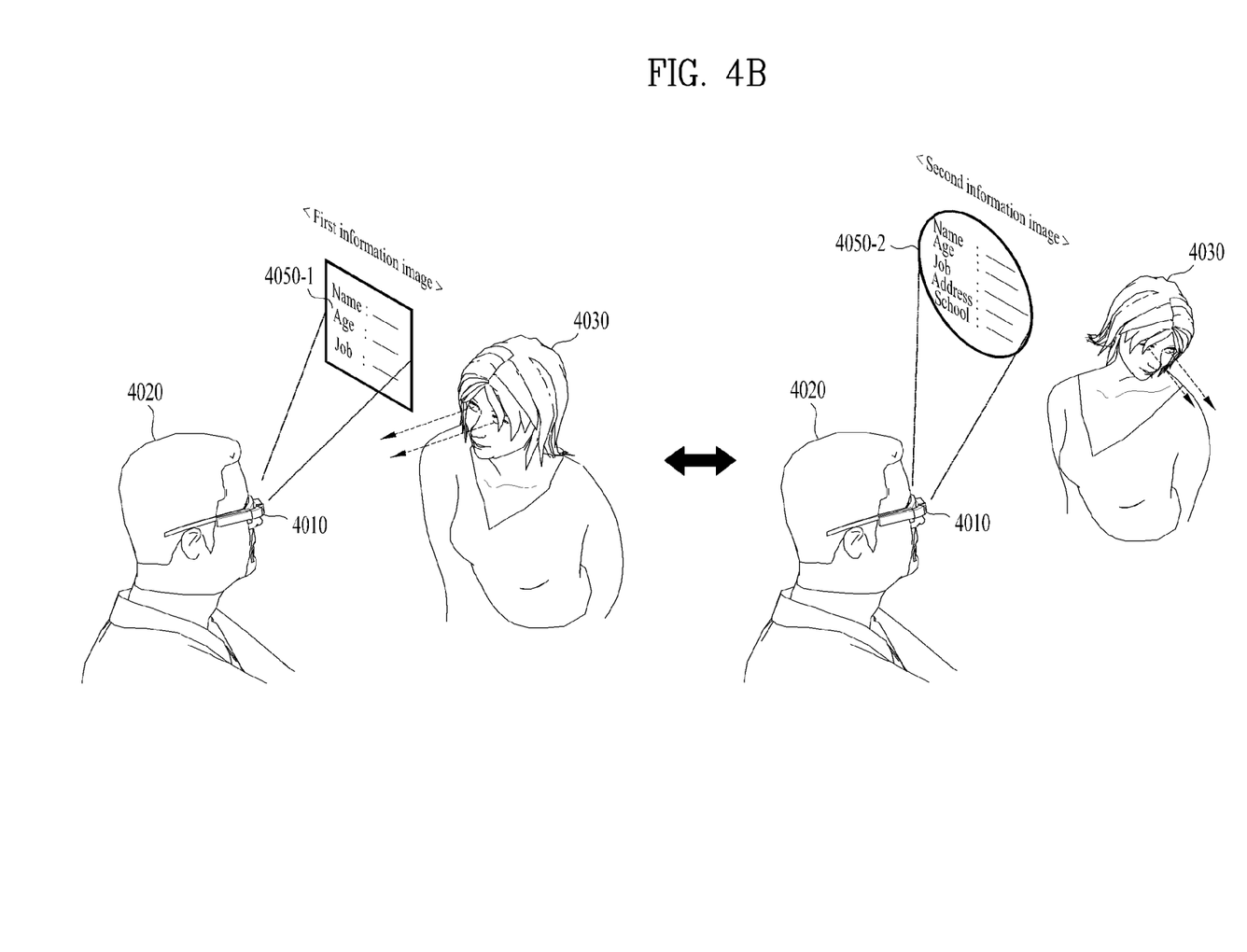
Figure 4C:
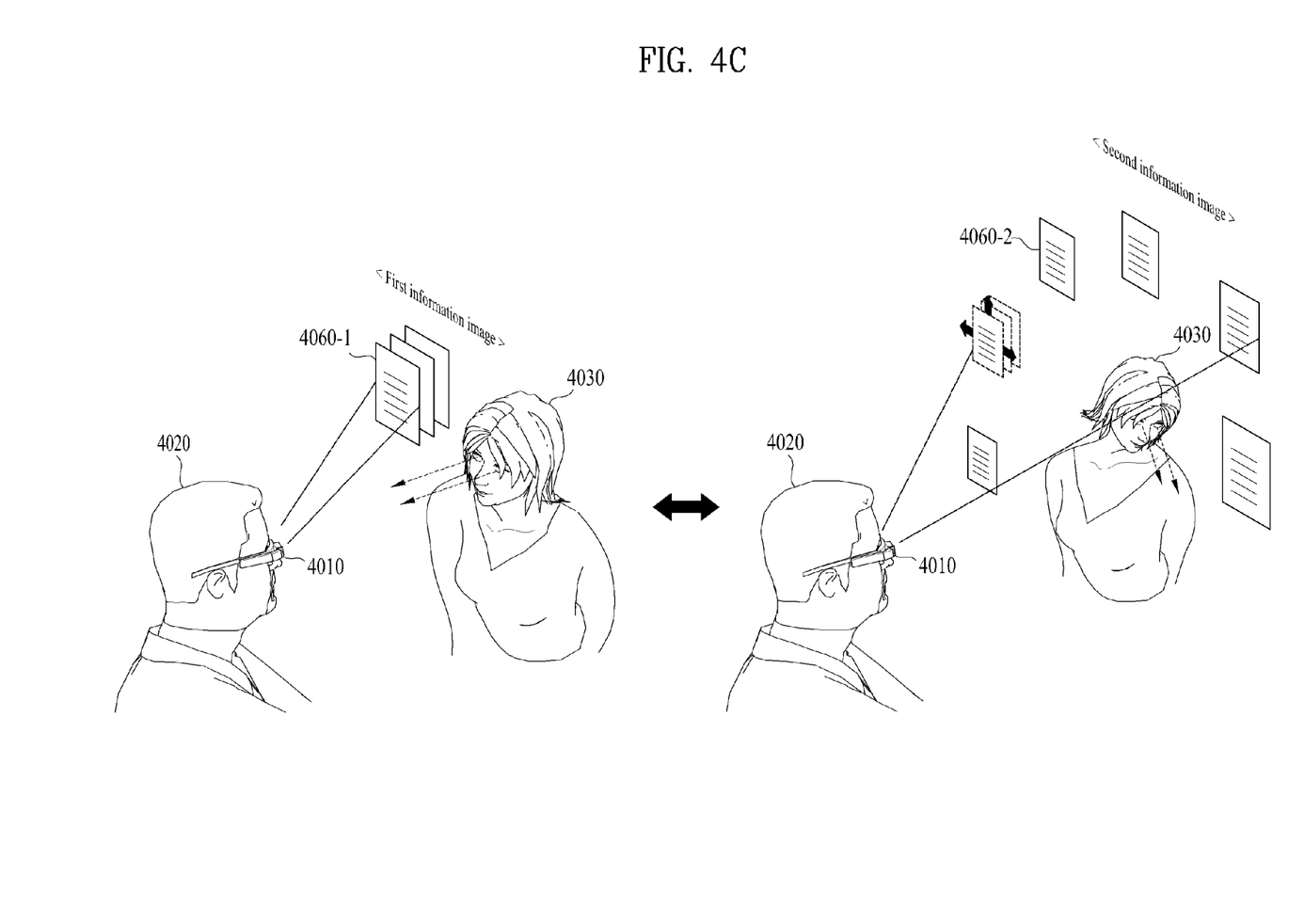

FIGS. 4A to 4C are diagrams illustrating an HMD 4010 for displaying a first information image or a second information image based on a state of an object, according to embodiments of the disclosure.

According to the disclosure, as described above, the HMD 4010 may detect a state of an object 4030. Upon detecting the state of the object 4030, the HMD 4010 may display an information image corresponding to the detected state. In more detail, upon detecting the state of the object 4030, the HMD 4010 may display a first information image. In addition, upon detecting the unstaring state of the object 4030, the HMD 4010 may display a second information image. In this case, the first information image may refer to an image with a different displayed content, a different information amount, a different displaying location, and/or a different category from the second information image. Various embodiments of the first information image and the second information image will be described in detail with reference to FIGS. 4A to 4C.

In the embodiment of the FIG. 4A, a first information image 4040-1 and a second information image 4040-2 may be images containing different information. In this case, in some embodiments, the first information image 4040-1 and the second information image 4040-2 may images containing independent information. In other words, the first information image 4040-1 and the second information image 4040-2 may be images containing different information that is not associated with each other. An HMD wearer 4020 may pre-set information to be provided through each of the first and second information images 4040-1 and 4040-2 so as to receive desired information in a desired situation through each information image. For example, the HMD wearer 4020 may set the HMD 4010 to display personal information corresponding to the detected object 4030 as the first information image 4040-1 and to display most-recently searched news information as the second information image 4040-2. Through this, the HMD wearer 4020 may receive personal information associated with a conversation companion 4030 to concentrate on a conversation during the conversation. On the other hand, when the HMD wearer 4020 does not have a conversation, the HMD wearer 4020 may receive information that is not associated with the conversation companion 4030 but is desired by the HMD wearer 4020. Accordingly, the HMD 4010 may effectively provide information appropriate for a situation to the HMD wearer 4020.

In addition, the first information image 4040-1 and the second information image 4040-2 may be images containing various information and may be set by a manufacturer during a manufacturing process of the HMD or may be set in various types according to a type of an executed application, a design objective of the HMD 4010, a design of the HMD 4010, the HMD wearer 4020, etc.

In the embodiment of the FIG. 4B, a first information image 4050-1 and a second information image 4050-2 may be images containing different amount of information. In this case, the first information image 4050-1 may be an image with a smaller amount of information than the second information image 4050-2. Alternatively, the second information image 4050-2 may be an image with a greater amount of information than the first information image 4050-1. This is because an unstaring state of the object 4030 means that a conversation between the HMD wearer 4020 and the conversation companion 4030 is cut off or the conversation companion 4030 concentrates on another object instead of the HMD wearer 4020. Thus the HMD wearer 4020 does no longer have to concentrate on the conversation companion 4030 and/or the conversation with the conversation companion 4030. Thus, in this case, the HMD 4010 may display the second information image 4050-2 containing a greater information amount to effectively provide a large amount of information to the HMD wearer 4020.

Thus, the HMD 4010 may control an amount of an image, a category, etc. of a display information image to control amount of information of the first information image 4050-1 and the second information image 4050-2. In addition, the HMD 4010 may display an additional information image in addition to the first information image 4050-1 to display the second information image 4050-2. For example, the second information image 4050-2 may be an image containing the first information image 4050-1 and an additional information image associated therewith. If the first information image 4050-1 is a picture, the second information image 4050-2 may be an image containing the first information image 4050-1 as a picture and additional information associated with a date and place in which the corresponding picture is captured, a person who captures the picture, etc.

As illustrated in FIG. 4B, the first information image 4050-1 and the second information image 4050-2 may contain personal information corresponding to the detected object 4030. In this case, the first information image 4050-1 may contain simple personal information corresponding to the object 4030 and the second information image 4050-2 may contain detailed personal information corresponding to the object 4030. Thus, the personal information contained in the first information image 4050-1 may also be contained in the second information image 4050-2. In addition, the first information image 4050-1 may be an information image summarized based on priority for each respective category of personal information of the second information image 4050-2.

In the embodiment of the FIG. 4C, a first information image 4060-1 and a second information image 4060-2 may be images displayed at different locations.

First, displayed locations of the first information image 4060-1 and the second information image 4060-2 may be determined based on a location of the object 4030. In other words, the HMD 4010 may determine the locations of the first information image 4060-1 and the second information image 4060-2 based on the location of the object 4030. For example, the HMD 4010 may display the first information image 4060-1 or the second information image 4060-2 at a different location from the detected object 4030. Thus, the HMD 4010 may control the object 4030 and an information image so as not to overlap each other.

Furthermore, the HMD 4010 may display the first information image 4060-1 and the second information image 4060-2 at different locations.

For example, the HMD 4010 may display the first information image 4060-1 at a location spaced apart from the object 4030 by a first distance and display the second information image 4060-2 at a location spaced apart from the object 4030 by a second distance (not shown). In this case, the second distance may be greater than the first distance. This is because the HMD wearer 4020 also needs to concentrate on the object 4030 in the staring state the object 4030 stares at the HMD wearer 4020 and thus the first information image 4060-1 is displayed adjacent to the object 4030 so as to increase concentration of the HMD wearer 4020 on the object 4030. However, this is purely exemplary. As described above, a distance from the object 4030 may be adjusted to adjust a location of an information image and also an angle based on the object 4030 may be adjusted to adjust the location of the information image.

As another example, as illustrated in FIG. 4B, the HMD 4010 may display an image formed by overlapping a plurality of pages as the first information image 4060-1 and display an image formed by scattering a plurality of pages as the second information image 4060-2 such that the first information image 4060-1 and the second information image 4060-2 are displayed at different locations. In this case, the first information image 4060-1 and the second information image 4060-2 may also provide different amount of information.

Referring to FIG. 4C, first, the HMD 4010 may display the first information image 4060-1 as an image formed by overlapping a plurality of pages in the staring state of the object 4030. In this case, upon detecting conversion from the staring state of the object 4030 into the unstaring state, the HMD 4010 may display an image formed by scattering the plural overlapping pages of the first information image 4060-1. That is, the second information image 4060-2 may be an image obtained by scattering or spreading the plural overlapping pages of the first information image 4060-1 in a predetermined direction. When a state of the object 4030 is converted, the HMD 4010 may scatter the overlapping pages of the first information image 4060-1 and display the pages, and thus, the second information image 4060-2 may have a different amount of displayed information as well as a different displaying location from the first information image 4060-1.

This is because a plurality of pages are overlapped and displayed at one location so as to increase concentration of the HMD wearer 4020 on another person in the staring state in which another person stares at the HMD wearer 4020. In addition, a plurality of pages are scattered and displayed at various locations so as to provide a large amount of various information to the HMD wearer 4020 in the unstaring state in which another person does not stare at the HMD wearer 4020. In this case, the HMD 4010 may display different image attributes such as a size, color, transparency, contrast, etc. of the scattered pages according to importance of information. For example, the HMD 4010 may display a page, a size of which is increased as importance of information contained therein is increased.

Figure 5A:
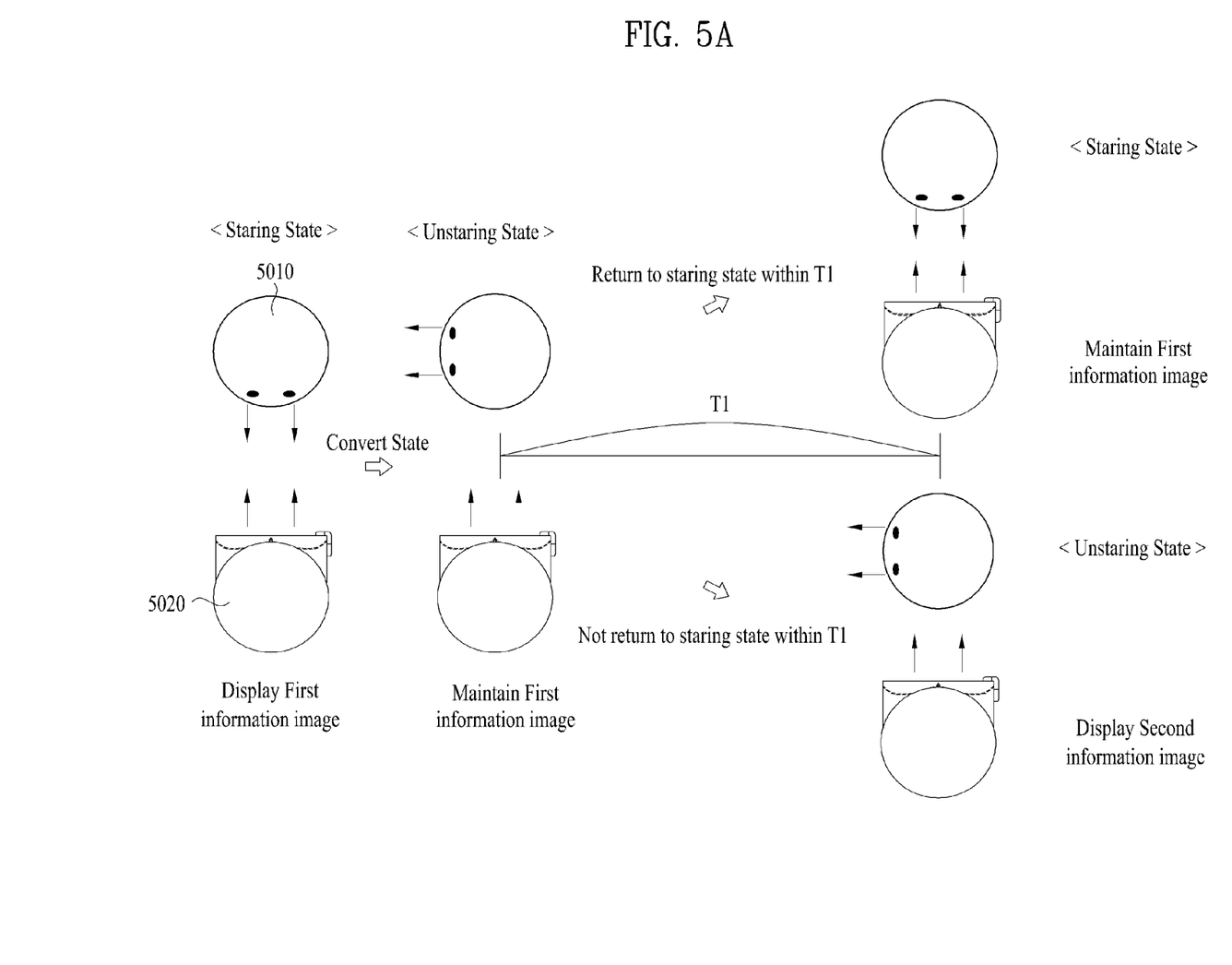
FIGS. 5A and 5B are diagrams illustrating an HMD in which information image maintenance time is present when an information image is converted according to an embodiment of the disclosure.

FIG. 5A is a diagram illustrating an HMD in which information image maintenance time is present when an information image is converted according to an embodiment of the disclosure.

When detecting conversion from a staring state to an unstaring state, the HMD may convert a first information image into a second information image. In addition, upon detecting conversion into the staring state from the unstaring state, the HMD may convert the second information image into the first information image. In this case, in some cases, the HMD may convert each information image into another information image after a predetermined period of time from a point when state conversion is detected. That is, according to the present embodiment, before an information image is converted, predetermined information image maintenance time may be present.

When the information image maintenance time is not present, if a state of an object 5010 is converted within a short period of time, an information image also needs to be rapidly converted. When an information image is rapidly converted, the HMD wearer 5020 may impede eyes of HMD wearer 5020 due to frequent conversion of the information image to cause confusion to the HMD wearer 5020 as well as cannot ensure a sufficient period of time for recognizing an information image.

Thus, according to the present embodiment, the HMD may determine whether a state of the object 5010 is restored while maintaining display of the information image for predetermined time instead of immediately converting the information image even if detecting state conversion. When the state of the object 5010 is restored within predetermined time, the HMD may maintain a displayed information image. On the other hand, when the state of the object 5010 is not restored within predetermined time, the HMD may convert a displayed information image into another information image.

In more detail, upon detecting conversion from the staring state into the unstaring state, the HMD may convert the first information image into the second information image after a first period of time T1 from a point when state conversion is detected. However, when the object 5010 is restored to the staring state within the first period of time T1, the HMD may maintain display of the first information image. In other words, when the object 5010 is re-converted into the staring state within the first period of time T1, the HMD maintains display of the first information image instead of converting the first information image into the second information image. Here, the first period of time T1 is predetermined maintenance time of the first information image and may be set by a manufacturer during a manufacturing process of the HMD or may be set in various types according to a type of an executed application, the HMD wearer 5020, a design of the HMD, a design objective of the HMD, etc.

In the same context, upon detecting conversion from the unstaring state into the staring state, the HMD may convert the second information image into the first information image after a second period of time from a point when state conversion is detected. However, when the object 5010 is restored to the unstaring state within the second period of time, the HMD may maintain display of the second information image. In other words, when the object 5010 re-converts the staring state into the unstaring state within the second period of time, the HMD may maintain display of the second information image instead of converting the second information image into the first information image. Here, the second period of time may also be predetermined maintenance time of the second information image and may be set by a manufacturer during a manufacturing process of the HMD or may be set in various types according to a type of an executed application, the HMD wearer 5020, a design of the HMD, a design objective of the HMD, etc.

Although not illustrated in FIG. 5A, upon displaying an information image according to state conversion of the object 5010, the HMD may update and display each information image. In more detail, upon re-displaying the first information image according to state conversion of the object 5010, the HMD may update the first information image before conversion and display the updated first information image. In the same context, upon re-displaying the second information image according to state conversion of the object 5010, the HMD may update the second information image before conversion and display the updated second information image. This is because the same information may be prevented from being repeatedly provided to the HMD wearer 5020. Thus, according to the present embodiment, whenever converting an information image, the HMD may update information containing an information image in real time and provide the updated information to the HMD wearer 5020. The first information image may be an image displayed in the staring state of the object 5010 and the second information image may be an image displayed in the unstaring state of the object 5010, as described above.

Figure 5B:
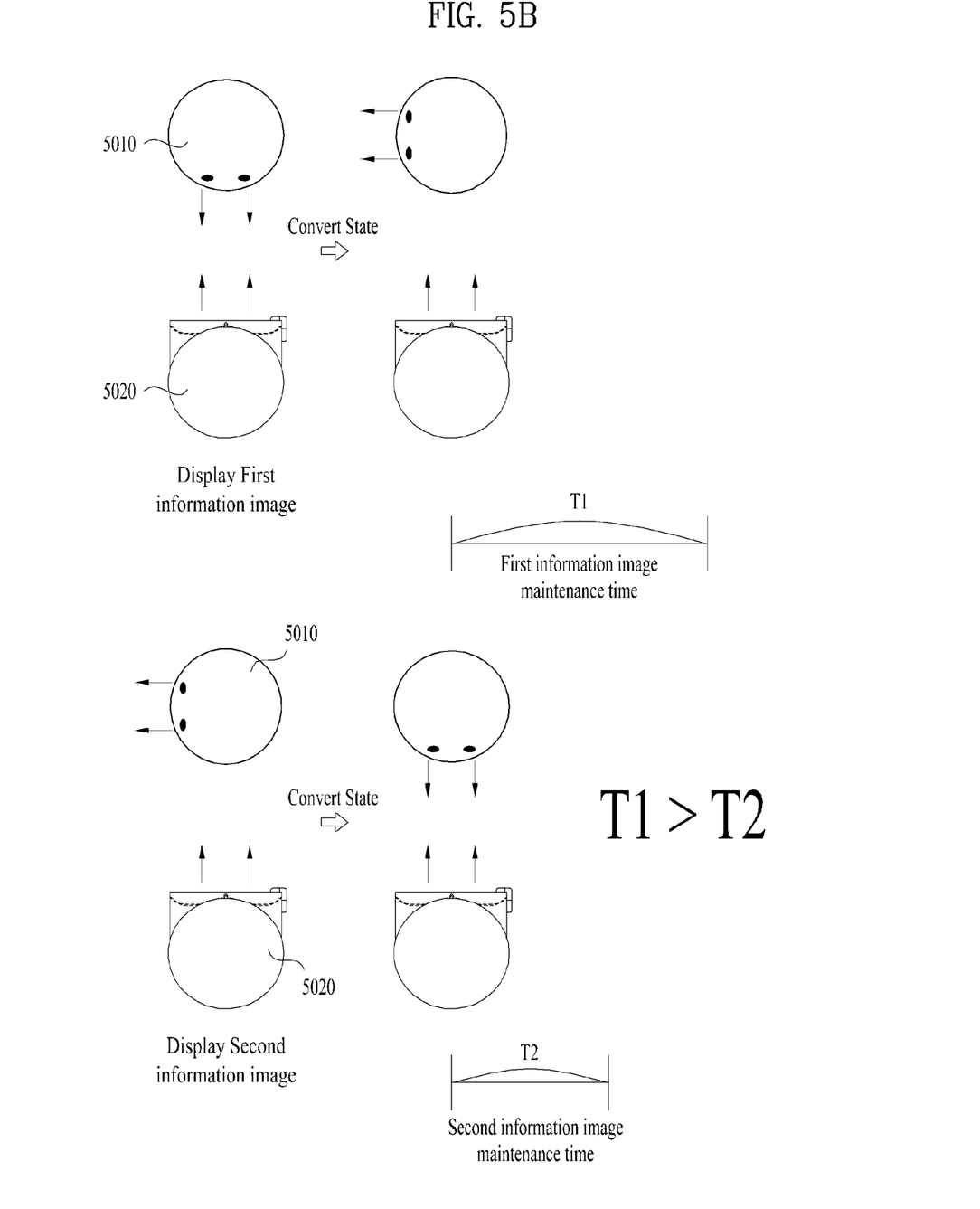

FIG. 5B is a diagram illustrating an HMD in which information image maintenance time is present when an information image is converted according to an embodiment of the disclosure. In particular, FIG. 5B is a diagram illustrating an HMD in which a first period of time T1 as first information image maintenance time and a second period of time T2 as second information image maintenance time are different, according to an embodiment of the disclosure.

As described with reference to FIG. 5A, in some embodiments, the HMD may provide information image maintenance time in order to prevent confusion of the HMD wearer 5020 and to effectively provide information to the HMD wearer 5020. In more detail, the HMD may provide the first period of time T1 as first information image maintenance time and the second period of time T2 as second information image maintenance time.

In this case, in some embodiments, the first period of time T1 may be greater than the second period of time T2. This is because the HMD wearer 5020 concentrates on the object 5010 and/or conversation with the object 5010. In more detail, the staring state of the object 5010 may indicate a state in which interest of the object 5010 concentrates on the HMD wearer 5020 like a case in which the object 5010 has a conversation with the HMD wearer 5020. In this case, even if the object 5010 in the staring state is converted into the unstaring state, possibility of immediately converting the object 5010 into the staring state is increased. Thus, the HMD may provide a long period of time as first information time to prepare restoration to the staring state of the object 5010. Furthermore, a decline in concentration of the HMD wearer 5020 on a conversation companion due to frequent image conversion may be prevented. Accordingly, according to the present embodiment, after conversion into the unstaring state, the HMD may also determine a state of the object 5010 as a staring state for the first period of time T1 and may maintain display of the first information image so as to prepare restoration to the staring state of the object 5010. In addition, according to the present embodiment, the HMD may allow the HMD wearer 5020 to concentrate on the object 5010 and/or a conversation with the object 5010.

On the other hand, when the object 5010 is converted from the unstaring state into the staring state, possibility of restoring to the unstaring state of the object 5010 is reduced. In this case, possibility of maintaining the staring state of the object 5010 is increased. Thus, in this case, the HMD may provide a shorter period of time than the first period of time T1 as the second period of time T2.

However, the aforementioned embodiment is purely exemplary. The first period of time T1 and the second period of time T2 may be set by a manufacturer during a manufacturing process of the HMD or may be set in various types according to a type of an executed application, a place, time, a design objective of the HMD, the HMD wearer 5020, etc. and may not be limited to the aforementioned embodiment.

Figure 6:
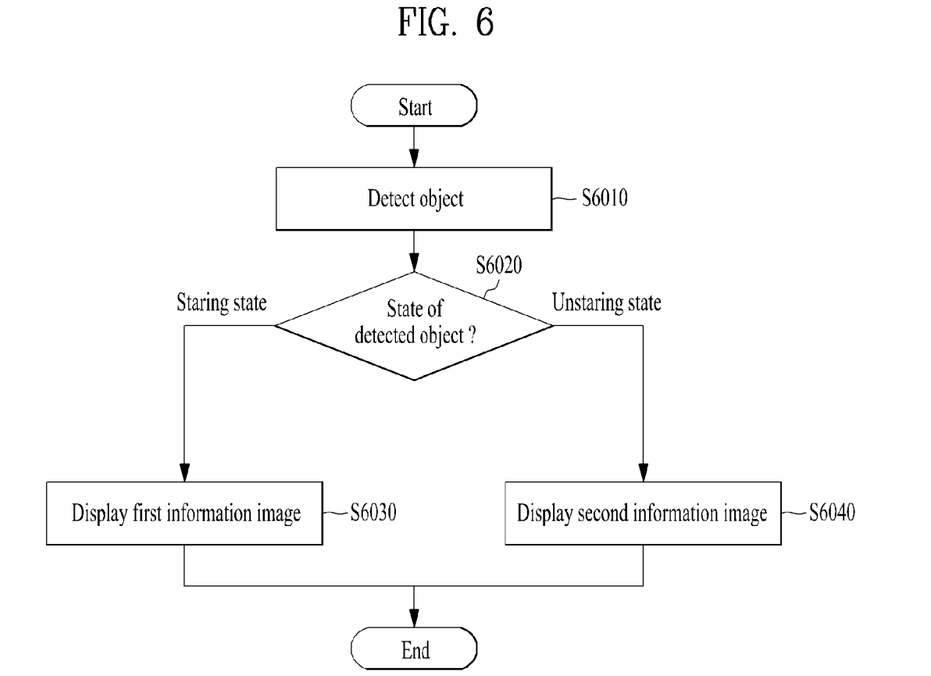
FIG. 6 is a flowchart of a method for controlling an HMD.

FIG. 6 is a flowchart of a method for controlling an HMD. In the flowchart, similar or repeated descriptions of FIGS. 1 to 5B will be omitted herein.

First, the HMD may detect an object (S6010). In more detail, the HMD may detect an object in front of the HMD using a camera unit included in the HMD. Here, the object refers to a person positioned in front of the HMD, and more particularly, a person that is positioned within a viewing angle of the camera angle included in the HMD and can be detected by the camera unit. This has been described with reference to FIG. 2.

Then, the HMD may determine a state of the detected object (S6020). The state of the object may include a staring state in which the object stares at an HMD and/or an HMD wearer and an unstaring state in which the object stares at the HMD and/or the HMD wearer. According to an embodiment, the HMD may determine the state of the object based on a face and/or eyes contained in the object or a horizontal rotation degree of the object. This has been described with reference to FIG. 3.

Upon detecting the staring state of the object, the HMD may display a first information image (S6030). According to an embodiment of the disclosure, when the face and/or eyes contained in the object are directed to the HMD wearer, the HMD may detect the staring state of the object. According to another embodiment of the disclosure, when a horizontal rotation degree of the object is within a staring range, the HMD may detect the staring state of the object. Upon detecting the staring state of the object, the HMD may display the first information image corresponding to the staring state.

On the other hand, upon detecting an unstaring state of the object (S6040), the HMD may display a second information image. According to an embodiment of the disclosure, when the face and/or eyes contained in the object are not directed to the HMD wearer, the HMD may detect the unstaring state of the object. According to another embodiment of the disclosure, when the horizontal rotation degree of the object is within an unstaring range, the HMD may detect the unstaring state of the object. Upon detecting the unstaring state of the object, the HMD may display the second information image corresponding to the unstaring state.

Here, the first information image may be an image with a different amount of displayed information from the second information image and/or a different displaying location from the second information image. For example, the first information image may be an image with a greater amount of information than the second information image. In addition, the first information image may be a displayed image spaced apart from the object by a first distance and the second information image may be a displayed image spaced apart from the object by a second distance. Here, the first distance may be shorter than the second distance. This has been described with reference to FIGS. 4A to 4C.

Although not illustrated in the flowchart, according to an embodiment of the disclosure, the HMD may provide information image maintenance time for maintaining display of an information image even if the state of the object is converted, in order to prevent confusion of the HMD wearer due to frequent image conversion and to effectively provide information to the HMD wearer. This has been described with reference to FIGS. 5A and 5B.

For convenience of description, diagrams have been separately described. However, it may be possible to obtain a new embodiment by combining the aforementioned embodiments described with reference to each diagram. In addition, according to needs of those of ordinary skill in the art, a design of a computer readable recording medium having recorded thereon a program for executing the aforementioned embodiments is within the scope of the disclosure.

The HMD and the method for controlling the same according to the aforementioned embodiments may be configured by selectively an entire or partial portion of the aforementioned embodiments in various modified forms rather than being limited to the configuration and method of the aforementioned embodiments.

The HMD and the method for controlling the same according to the disclosure can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), magnetic tapes, floppy disks, optical data storage devices, etc. In addition, the computer readable recording medium may be embodied as a carrier wave such as transmission via the Internet. The computer readable recording medium can also be distributed over network coupled computer systems so that the computer readable code is stored and executed in a distributed fashion.

In the disclosure, an angle, a distance, and a direction may include a substantial angle, distance, and direction within a predetermined range as well as an accurate value. That is, in the disclosure, an angle, a distance, and a direction may refer to a substantial angle, distance, and direction and may have an error within a predetermined range.

In this disclosure, an object invention and a method invention have been described. If necessary, both the inventions may be subsidiarily applied. According to an embodiment of the disclosure, the HMD according to the disclosure may control display of an information image according to whether the object stares at an HMD wearer to effectively provide information appropriate for a state to the HMD wearer.

According to another embodiment of the disclosure, the HMD may detect a direction of a face and/or eyes contained in the object or a horizontal rotation degree of the object to detect a state of the object, thereby more accurately and effectively the state of the object.

According to another embodiment of the disclosure, the HMD according to the disclosure may provide information image maintenance time and may not immediately convert an information image even if a state of the object is converted, thereby preventing confusion of the HMD wearer caused due to frequent conversion of an information image. Furthermore, the HMD according to the disclosure may determine whether the state of the object is restored for the information image maintenance time and maintain display of the information image when the state of the object is restored within the corresponding time, thereby ensuring continuity and stability of providing information to the HMD wearer.

A detailed effect of the disclosure has been described above in more detail.

It will be apparent to those skilled in the art that various modifications and variations can be made in the disclosure without departing from the spirit or scope of the disclosure. Thus, it is intended that the disclosure covers the modifications and variations of the disclosure provided they come within the scope of the appended claims and their equivalents.

What is claimed is:

1. A head mounted display (HMD) comprising:
a camera unit configured to capture an image;
a display unit configured to display an information image; and
a processor configured to control the camera unit and the display unit,
wherein the processor is further configured to:
detect an object using the camera unit, wherein the object has a staring state in which the object substantially stares at a wearer wearing the HMD and an unstaring state in which the object does not substantially stares at the wearer,
display a first information image when the object in the staring state is detected,
display a second information image when the object in the unstaring state is detected,
convert the first information image into the second information image after a first period of time from when conversion into the unstaring state from the staring state is detected, and
convert the second information image into the first information image after a second period of time from when conversion into the staring state from the unstaring state is detected,
wherein the first information image includes at least one of a different amount of displayed information from the second information image and a different displaying location from the second information image, and
wherein the first period of time is longer than the second period of time.

2. The HMD according to claim 1, wherein the object is a person positioned in front of the HMD.

3. The HMD according to claim 1, wherein the processor is further configured to detect the staring state or the unstaring state by detecting at least one of a face and eyes contained in the object.

4. The HMD according to claim 3, wherein the processor is further configured to detect the staring state when the face is directed to the wearer and detect the unstaring state when the face is not directed to the wearer.

5. The HMD according to claim 4, wherein the processor is further configured to:
detect the staring state when the face is directed to a region within a predetermined diameter from the HMD worn by the wearer, and
detect the unstaring state when the face is not directed to the region.

6. The HMD according to claim 3, wherein the processor is further configured to detect the staring state when the eyes are directed to the wearer, and detect the unstaring state when the eyes are not directed to the wearer.

7. The HMD according to claim 6, wherein the processor is further configured to:
detect the staring state when the eyes are directed to a region within a predetermined diameter from the HMD worn by the wearer, and
detect the unstaring state when the eyes are not directed to the region.

8. The HMD according to claim 3, wherein the processor is further configured to:
detect the unstaring state when at least one of the face and the eyes rotates to deviate from a predetermined angle range in the staring state, and
detect the staring state when at least one of the face and the eyes rotates to enter the predetermined angle range in the unstaring state.

9. The HMD according to claim 8, wherein the predetermined angle range is determined based on a direction in which the object stares at the wearer.

10. The HMD according to claim 1, wherein the processor is further configured to:
maintain the first information image when detecting re-conversion into the staring state within the first period of time, and
maintain the second information image when detecting re-conversion into the unstaring state within the second period of time.

11. The HMD according to claim 1, wherein the processor is further configured to:
update and display the first information image when the first information image is converted into the second information image and the second information image is re-converted into the first information image, and
update and display the second information image when the second information image is converted into the first information image and the first information image is re-converted into the second information image.

12. The HMD according to claim 1, wherein the second information image has a larger amount of information than the first information image.

13. The HMD according to claim 12, wherein the second information image includes the first information image and an additional information image related to the first information image.

14. The HMD according to claim 12, wherein the first information image contains simple personal information corresponding to the object, and the second information image contains detailed personal information corresponding to the object.

15. The HMD according to claim 1, wherein the processor is further configured to display the first information image or the second information image based on a location of the object.

16. The HMD according to claim 15, wherein the processor is further configured to
display the first information image at a location spaced apart from the object by a first distance, and display the second information image at a location spaced apart from the object by a second distance, and
wherein the second distance is greater than the first distance.

17. A method for controlling a head mounted display (HMD), the method comprising:
detecting an object, wherein the object has a staring state in which the object substantially stares at a wearer wearing the HMD and an unstaring state in which the object does not substantially stares at the wearer;
displaying a first information image when the object in the staring state is detected and displaying a second information image when the object in the unstaring state is detected;
converting the first information image into the second information image after a first period of time from when conversion into the unstaring state from the staring state is detected; and
converting the second information image into the first information image after a second period of time from when conversion into the staring state from the unstaring state is detected,
wherein the first information image includes at least one of a different amount of displayed information from the second information image and a different displaying location from the second information image, and
wherein the first period of time is longer than the second period of time.

\* \* \* \* \*